US008496552B2

(12) United States Patent
Kvasnicka et al.

(10) Patent No.: US 8,496,552 B2

(45) Date of Patent: Jul. 30, 2013

(54) ANGLED SPOKE PULLEY DESIGN

(75) Inventors: Charles Raymond Kvasnicka, Grosse Ile, MI (US); Scott Willis, Gibraltar, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 336 days.

(21) Appl. No.: 12/882,136

(22) Filed: Sep. 14, 2010

(65) Prior Publication Data

US 2012/0065011 A1 Mar. 15, 2012

(51) Int. Cl.
*F16H 55/40* (2006.01)
*F16H 7/02* (2006.01)

(52) U.S. Cl.
USPC .......... 474/148

(58) Field of Classification Search
USPC .......... 474/98, 99, 148, 195, 199, 188, 161
See application file for complete search history.

(56) References Cited

U.S. PATENT DOCUMENTS

| | | | | |
|---|---|---|---|---|
| 4,316,589 | A * | 2/1982 | Stranders | 242/613 |
| 5,362,280 | A | 11/1994 | Hirai et al. | |
| 5,417,617 | A | 5/1995 | Milton | |
| 5,630,769 | A * | 5/1997 | Schmidt et al. | 474/167 |
| 5,695,176 | A * | 12/1997 | Colford | 267/155 |
| 5,803,855 | A | 9/1998 | Russell | |
| 6,881,166 | B1 * | 4/2005 | Burkhardt et al. | 474/176 |
| 6,945,892 | B2 | 9/2005 | Knutson | |
| 7,695,385 | B2 * | 4/2010 | Barraud et al. | 474/199 |
| 2007/0060430 | A1 | 3/2007 | Alden et al. | |
| 2007/0232427 | A1 * | 10/2007 | Ueno et al. | 474/199 |
| 2008/0219607 | A1 * | 9/2008 | Murao | 384/417 |
| 2009/0191995 | A1 * | 7/2009 | Hamada et al. | 474/94 |

FOREIGN PATENT DOCUMENTS

| | | | |
|---|---|---|---|
| JP | 2003-21196 | A | 1/2003 |
| JP | 2007-278442 | A | 10/2007 |
| WO | 95/16867 | | 6/1995 |

OTHER PUBLICATIONS

"New Patents for Numerous Innovations for Passenger Cars and Industrial Sectors: The Schaeffler Group is among the top five leaders in innovation," Schaeffler Technologies GMBH & Co., <http://www.schaeffler.us/content.schaeffler.us/us/press/press-releases/press-details.jsp?id=3386241>, May 11, 2010, 2 pages.

* cited by examiner

*Primary Examiner* — William E Dondero
*Assistant Examiner* — Mark K Buse
(74) *Attorney, Agent, or Firm* — Julia Voutyras; Alleman Hall McCoy Russell & Tuttle LLP

(57) ABSTRACT

An idler pulley is described for a front end accessory drive. The idler pulley includes plurality of angled spokes, such as angled ribs molded into the pulley to join an outer hub and an outermost belt interacting region. As the belt runs over the surface of the pulley, any defects on the belt running surface of the pulley due to shrinkage and fill are now angled, and angling of the defects reduces direct impact with the belt and therefore reduces the structureborne noise produced by operation of the belt and the pulley.

20 Claims, 2 Drawing Sheets

ANGLED SPOKE PULLEY DESIGN

FIELD

The present application relates to a pulley with NVH reducing features in a serpentine belt drive system for a vehicle.

BACKGROUND AND SUMMARY

Various engine systems may use pulleys, such as the engine front end accessory drive (FEAD). In one example, the FEAD includes a serpentine belt system driving a plurality of peripheral devices, such as an alternator, power steering pump, water pump, A/C compressor, air pump, etc. Further, the belt may also be guided by an idler pulley and/or a belt tensioner (which may be spring loaded, hydraulic, or manual). In some examples, the pulley wheel is attached to an axle via spokes which are extended from the axle to the wheel, where the spokes intersect with the wheel as structural ribs traversing straight across the width of the wheel and perpendicular to the sides of the wheel.

A pulley, such as a nylon backside idler may emit a structure-borne noise corresponding the frequency and number of structural ribs when used in an automotive FEAD or other serpentine belt drive system application. The perpendicular structural ribs result in a harmonic defect on the belt running surface of the idler pulley due to material shrinkage and mold fill abnormalities. The defects on the surface of the pulley can impact the belt as it passes over the outer surface of the idler pulley, resulting in the structure-borne noise audible to the user.

In one approach, described in U.S. Pat. No. 6,648,784, an idler sprocket/pulley includes teeth, complementary to teeth of a belt in the belt drive system. The teeth of the sprocket/pulley have an arcuate pitch that substantially matches the pitch of a belt when engaged with the sprocket/pulley at the mating interface, thus accounting for the wrap angle of the belt and reducing noise generated during operation of the belt system due to reduced contact between a sprocket tooth and a belt land.

The inventors herein recognize potential issues with such an idler pulley design. As one example, in the previously described pulley, the pulley only provides noise reduction when used in combination with a specific belt. The pitch of the belt must precisely match that of the pulley in order to function in noise reduction. If a replacement belt is provided without the specific matching pitch, noise may be significantly increased.

In another example, the belt used in combination with the previously described pulley may stretch or warp as it ages. As the belt ages, the teeth of the belt may no longer precisely match the teeth of the pulley, again resulting in increased noise generation during vehicle operation.

Some of the above issues may be at least partly addressed by a belt drive system for a vehicle, comprising: a front end accessory drive including a plurality of accessory pulleys and an idler pulley rotatably coupled via a continuous belt, the idler pulley comprising, a hub which rotates around a rotational axis; a belt contacting surface on an outermost circular portion; and a plurality of angled spokes connecting the hub and the outermost circular portion.

In this example, the idler pulley may include angled ribs molded into the pulley to join the hub and an outermost circular portion. As the belt runs over the surface of the pulley, any defects on the belt running surface of the pulley due to shrinkage and fill are now angled. Angling of the defects reduces direct impact with the belt and therefore reduces the structureborne noise produced by operation of the belt and the pulley. The pulley may further include a smooth belt contacting surface, such that the pulley may be used with a belt with a variety of teeth pitches or a belt that substantially lacks teeth. Thus the pulley may provide noise reduction even as the belt ages and/or if the belt is replaced with a one of a differing tooth pitch.

In one specific example, an idler pulley includes a hub which is rotatably attached to a rotational axis of a FEAD of a vehicle. A belt contacting surface of the pulley may be smooth or include teeth, and spokes connecting the hub to the surface of the pulley may be angled relative to the sides of the pulley (non-perpendicular and non-parallel). A cross section of adjacent spokes yields a series of continuous peaks and valleys having an equal angle between each adjacent ribs and the height of the peaks and valleys is equal to the width of the belt contacting surface. As the spokes are continuous, the pulley may have greater material strength than a pulley with discontinuous spokes.

The angle between each of the adjacent spokes may range from 5° to 100°. The pulley may be used in combination with a belt with a variety of teeth pitches or a belt that substantially lacks teeth. The pulleys may also retain noise reducing capabilities even as a belt stretches or sustains defects over time and/or if the belt is replaced with one of a differing tooth pitch.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
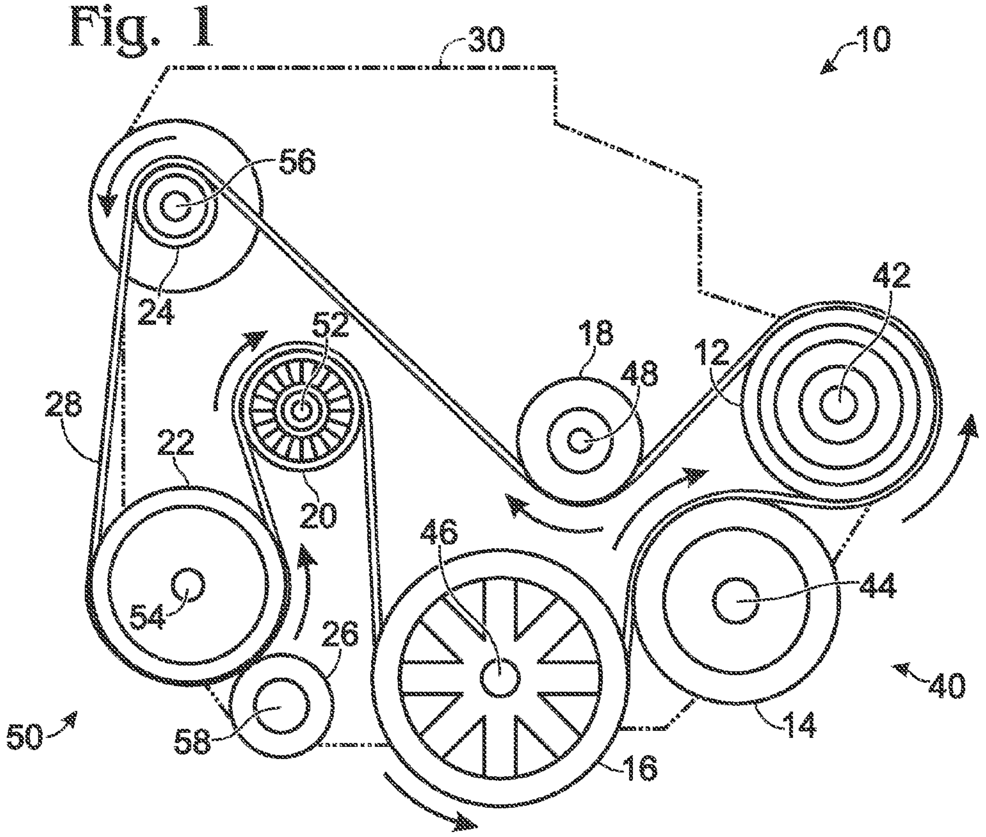
FIG. 1 includes an example embodiment of a front end accessory drive for a vehicle.

The following description relates to serpentine belt drive system for a front end accessory drive (FEAD) of a vehicle, such as a passenger vehicle, configured to power a variety of peripheral vehicle components, including but not limited to a water pump, a power steering pump, an air conditioner, and an alternator. An example embodiment of such a FEAD system is shown in FIG. 1.

In this embodiment, each of a plurality of pulleys is rotatably attached to one of a plurality of rotational axes on in an FEAD on a front of an engine for a vehicle. The plurality of pulleys are rotatably coupled via a continuous drive belt, such that the rotation of a crankshaft pulley drives rotation of all other pulleys. The rotational axis of a pulley may be coupled to a peripheral vehicle component, such as one of those listed above, and may provide power to operate the peripheral vehicle component.

The plurality of pulleys in the FEAD may include a water pump pulley, a power steering pump pulley, a crankshaft pulley, and an air conditioning compressor pulley, a belt tensioner pulley, and an idler pulley. As stated above, the rotation of the crankshaft pulley may drive rotation of the other pulleys in the system. The rotational axis of the crankshaft pulley may be coupled to the engine, and the engine may rotate the rotational axis to provide power to the crankshaft pulley. Rotation of the crankshaft pulley moves the drive belt across its surface, and in turn movement of the belt may rotate the other pulleys.

The drive belt may be guided by the idler pulley and/or belt tensioner. The rotational axes of the idler pulley and the belt tensioner are not coupled to peripheral vehicle components and do not provide power/torque to peripheral vehicle components. Instead, the belt tensioner includes an internal preset spring and provides tension for the continuous belt and the idler pulley may be used to affect a direction of rotation and spacing rotational axes. The idler pulley may be placed between two pulleys to change the direction of rotation and/or the spacing. The idler pulley rotates in the opposite direction of the preceding driving pulley, and the following pulley rotates in the opposite direction of the idler pulley, the same direction of the preceding driving pulley.

Figure 2:
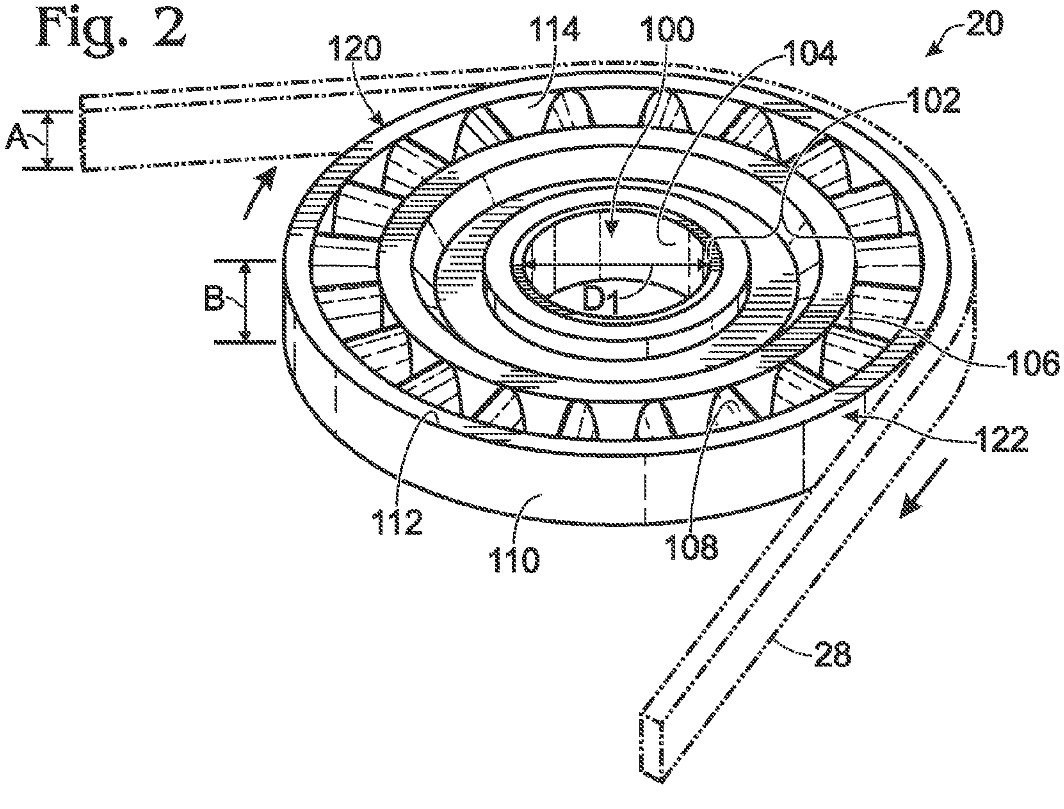
FIG. 2 includes an example embodiment of an idler pulley with angled spokes from the front end accessory drive of FIG. 1.
Figure 3:
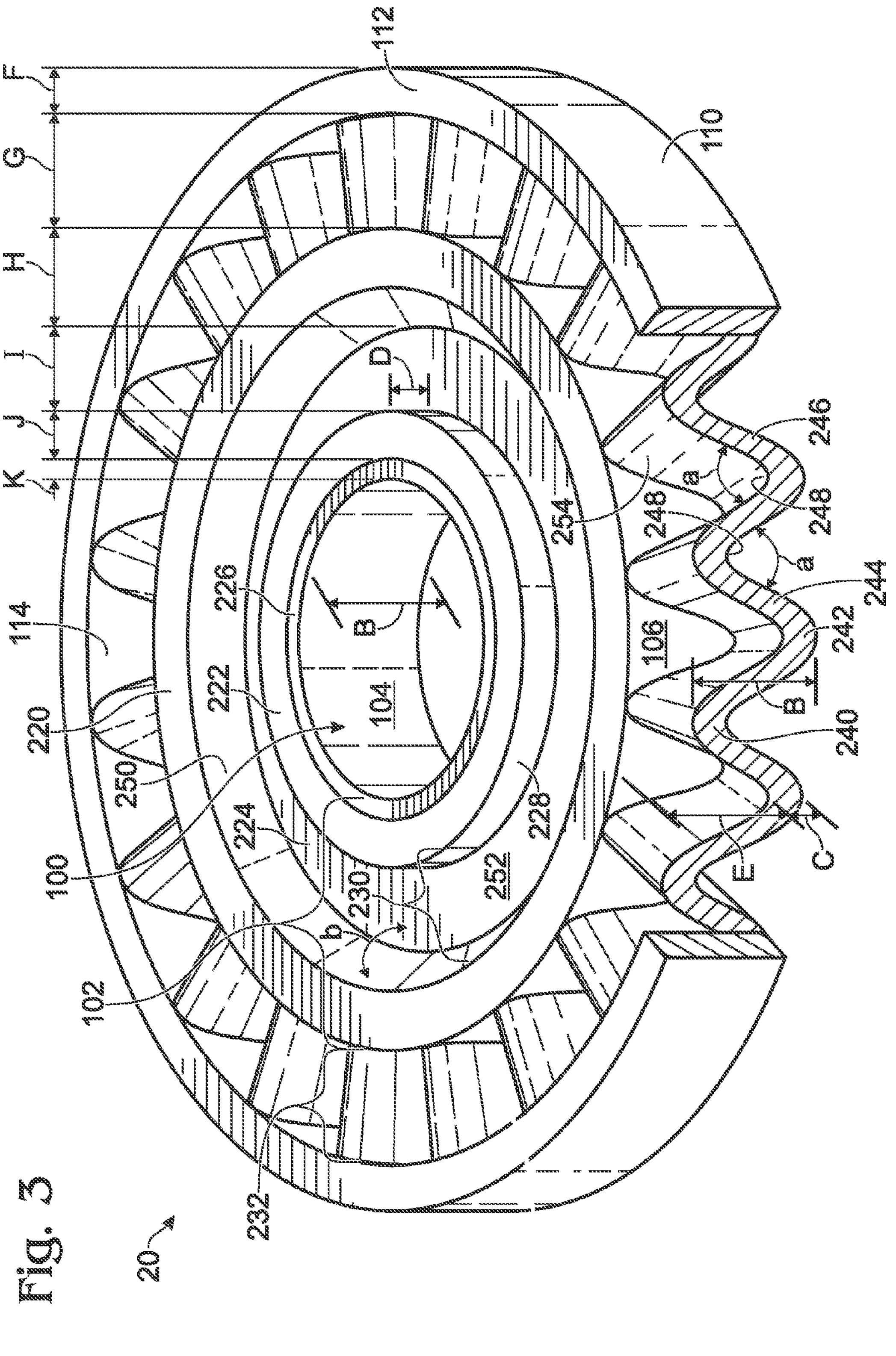
FIG. 3 includes the idler pulley of FIG. 2 wherein a section of an outermost circular portion is cutaway to reveal the conformation of the spokes.

An example embodiment of an idler pulley drawn to scale is shown in FIGS. 2 and 3. In this example embodiment, an idler pulley includes a hub, which rotates around and is fixed to a rotational axis, a belt contacting surface on an outermost circular portion, and a plurality of angled spokes connecting the hub and the outermost circular portion. Such a conformation for an idler pulley may be advantageous in that structure-borne noise corresponding to the number and frequency of spokes may be reduced because the spokes intersect the outermost circular portion at an angle. As such, defects on the belt contacting surface of the pulley due to shrinkage and fill during molding are also angled, and will impact the belt at an angle during operation of the FEAD, thereby reducing noise.

Further, other advantages may include that the idler pulley may retain its noise reducing features even as the belt ages, because it does not rely on a specific spacing or pitch of teeth in the belt. Additionally, the belt may be replaced with a generic belt or a belt that substantially lacks teeth and the idler pulley may still provide noise reduction. For example, as a belt ages is may stretch and lose a specific spacing or pitch of the teeth on the belt. In this example, if the idler pulley relied on a specific pitch or spacing of teeth on the belt it may no longer provide noise reduction. However, as the idler pulley may have a smooth belt contacting surface and angled spokes, the idler pulley may provide noise reduction even if a drive belt has stretched or been replaced with a belt with different pitch or spacing of teeth.

FIG. 1 shows a front end accessory drive (FEAD) 10 for a vehicle including a plurality of pulleys 40. Plurality of pulleys 40 includes water pump pulley 12, power steering pump pulley 14, crankshaft pulley 16, alternator pulley 18, first idler pulley 20, air conditioning (A/C) compressor pulley 22, drive belt tensioner 24, and second idler pulley 26. Accordingly, water pump pulley 12 may provide power to a water pump (not shown); power steering pump pulley 14 may provide power to a power steering pump (not shown); crankshaft pulley 16 may receive power from a crankshaft (not shown); and, A/C compressor pulley 22 may provide power to an air conditioning unit (not shown). In alternate embodiments, more or fewer pulleys may be included in plurality of pulleys 40 to provide power peripheral vehicle components. Additionally, alternate embodiments may include more than one idler pulley.

Each of the plurality of pulleys 40 are coupled to engine 30 via one of a plurality of rotational axes 50. Specifically, water pump pulley 12 is coupled to rotational axis 42; power steering pump pulley 14 is coupled to rotational axis 44; crankshaft pulley 16 is coupled to rotational axis 46; alternator pulley 18 is coupled to rotational axis 48; first idler pulley 20 is coupled to rotational axis 52; air conditioning (A/C) compressor pulley 22 is coupled to rotational axis 54; drive belt tensioner 24 is coupled to rotational axis 56; and, second idler pulley 26 is coupled to rotational axis 58.

Plurality of pulleys 40 are rotatably coupled via drive belt 28. In FIG. 1, drive belt 28 is shown as a single continuous serpentine belt. In alternate embodiments, the pulleys may be coupled via multiple V-belts. Counterclockwise rotation of rotational axis 46 may be powered by engine 30. Crankshaft pulley 16 is fixed to rotational axis 46 and may rotate with rotational axis 46. As the outer edge of crankshaft pulley 16 moves, the drive belt 28 may contact the outer edge and move at the same rate.

Concurrently, movement of drive belt 28 by the crankshaft pulley 16 may drive rotation of the other pulleys. Specifically, drive belt tensioner 24 may rotate counterclockwise; A/C compressor pulley 22 may rotate counterclockwise; second idler pulley 26 may rotate clockwise; first idler pulley 20 may rotate clockwise; crankshaft pulley 16 may rotate counterclockwise; power steering pump pulley 14 may rotate clockwise; and, water pump pulley 12 may rotate clockwise. In an alternate embodiment, the crankshaft pulley may rotate counter clockwise, and thus reverse the rotation of all other pulleys. Rotation of pulleys coupled to peripheral vehicle components may provide power to operate the peripheral vehicle components.

As shown in FIG. 1, first idler pulley 20 is disposed between and above A/C compressor pulley 22 and crankshaft pulley 16. Drive belt 28 extends downward from belt tensioner 24 and wraps around approximately ⅔ of A/C compressor pulley 22.

Movement of drive belt 28 may rotate A/C compressor pulley 22 in a counterclockwise direction during operation of the vehicle. Drive belt 28 extends upward from A/C compressor pulley 22 to first idler pulley 20 and wraps around approximately ½ of first idler pulley 20. Movement of drive belt 28 may rotate first idler pulley 20 in a clockwise direction during operation of the vehicle. Drive belt 28 again extends downward between first idler pulley 20 and crankshaft pulley 16 and wraps around approximately ½ of crankshaft pulley 16. Movement of drive belt 28 may rotate crankshaft pulley 16 in a counterclockwise direction during operation of the vehicle.

Inclusion of first idler pulley 20 in FEAD 10 at this location, allows for A/C compressor pulley 22 and crankshaft pulley 16 to be rotated in the same direction (i.e. counterclockwise) though they are proximal. If first idler pulley 20 were not included at this location, crankshaft pulley 16 may rotate in an opposing direction of A/C compressor pulley 22 (i.e. clockwise). For example, after wrapping around approximately ½ of crankshaft pulley 16, drive belt 28 extends upward and wraps around approximately ⅓ of power steering pump pulley 14. As there is no idler pulley between crankshaft pulley 16 and power steering pump pulley 14, power steering pump pulley 14 may rotate in an opposing direction relative to crankshaft pulley 16, in a clockwise direction.

The structure of first idler pulley 20 is shown in greater detail in FIGS. 2 and 3. First idler pulley 20 has an overall flat disc-like shape with a centrally located through hole 100, which is a generally circular space. In alternate embodiments, through hole 100 may have other shapes which correspond to the profile of the profile of the rotational axis. For example, the rotational axis may have a hexagonal profile and therefore the through hole may have a generally hexagonal shape. At an inner region surrounding through hole 100, first idler pulley 20 includes hub 102. An inner wall 104 of hub 102 may contact and be fixed to rotational axis 52. A diameter $D_1$ of through hole 100 is substantially equal to a diameter of rotational axis 52 (not shown).

A smooth belt contacting surface 110 encompasses an outer circular portion 112. A plurality of angled spokes 108 are extended between an outer wall 106 of hub 102 and an inner wall 114 of outer circular portion 112. Drive belt 28 is aligned with belt contacting surface 110. Drive belt 28 has a width A and belt contacting surface 110 has a width B. Width A is less than width B. An example width A is approximately 2 mm less than width B. In alternate embodiments, the belt contacting surface may include a lip edge on one or both sides. A lip edge may substantially abut a side of the drive belt and contribute to alignment of the drive belt. In yet another embodiment, the belt contacting surface may have a central groove or multiple grooves, giving a cross section of the belt contacting surface an overall V-shape or multiple V-shapes, respectively. A central groove may also contribute to alignment of the drive belt.

During operation of the vehicle wherein movement drive belt 28 is driven by generator pulley 18, drive belt 28 may impact the belt contacting surface 110 at line of impact 120. Contact between drive belt 28 and belt contacting surface 110 may drive rotation of first idler pulley 20. Drive belt 28 may discontinue contact with belt contacting surface 110 at line of separation 122. Drive belt 28 may cyclically make contact at line of impact 120 and separate at line of separation 122 with each location of belt contacting surface 110. As such, clockwise rotation of first idler pulley 20 may be driven by movement of drive belt 28.

First idler pulley 20 is shown in greater detail in the cutaway drawing of FIG. 3. In FIG. 3 a portion of outer circular portion 112 is removed to show the structure of plurality of angled spokes 108. In this embodiment, plurality of angled spokes 108 are a series of peaks and valleys having a height with a distance of B. The width of plurality of angled spokes 108 has a distance C. A space, such as space 254 is the area between a side of first idler pulley 20 and a top of a peak (such as rounded portion 240) or bottom of a valley (such as rounded portion 242). In the example pulley of FIG. 3, the addition of distance C and distance E is equal to distance B. In the example of FIG. 3, the height of any given peak or valley in the plurality of angled spokes 108 is of equal distance as the width of belt contacting surface 110. In alternate embodiments, the addition of C and E may not be equal to distance B. In one example, the values of A, B, C, D, and E are in the ranges 10 mm-43 mm, 12 mm-45 mm, 1 mm-4 mm, and 12 mm-24 mm, respectively.

Plurality of angled spokes 108 are each connected via a rounded portion, such as rounded portion 240 and rounded portion 242. Each rounded portion is located at a top of a peak, such as rounded portion 240, or a bottom of a valley, such as rounded portion 242. A straight portion, such as straight portions 244 and 246, connects each of the rounded portions. Thus, plurality of angled spokes 108 are continuous and adjacent spokes alternate in direction. An angle between adjacent spokes 248 in plurality of angled spokes 108 is substantially equal, having an angle a. In one example, the angle a is approximately 5°-100°. In alternate embodiments, the plurality of angled spokes may exclude rounded portions and thus be discontinuous. Further, if the spokes are discontinuous, they may be angled in the same direction, rather than in alternating directions. In even another example, the angle between adjacent spokes may not be equal, and thus the angle between adjacent spokes may be varied at different locations of the pulley.

Hub 102 includes four concentric circular portions with flat side walls. First circular portion 226 is innermost and fourth circular portion 220 is outermost of hub 102. Second circular portion 222 is disposed between first circular portion 226 and third circular portion 224. Third circular portion 224 is disposed between second circular portion 222. In this embodiment, first circular portion 226, second circular portion 222, and fourth circular portion 220 all have widths of the distance B, equal to the width of outermost circular portion 112. In alternate embodiments, the hub may include more or fewer concentric circular portions and/or the widths of each may vary. Additionally, in some embodiments may include additional spokes in a circular portion.

In this example, outermost circular portion 112 may be considered a fifth circular portion and plurality of angled spokes 108 may be considered a sixth circular portion. Each circular portion has a radial length which contributes to the total radial length L of first idler pulley 20. First circular portion 226 has a radial length K. Second circular portion 222 has a radial length J. Third circular portion has a radial length I. Fourth circular portion has a radial length H. Sixth circular portion (plurality of angled spokes 108) has a radial length G. Fifth circular portion (outermost circular portion 112) has a radial length F. In order from largest to smallest the radial lengths are as follows: G, I, H, J, F, K. In this embodiment, ranges for G, I, H, J, F, and K are 10 mm-120 mm, 5 mm-7 mm, 3 mm-4 mm, 2 mm-4 mm, and 0.1 mm-0.5 mm, repectively. In alternate embodiments, the relative sizes of each portion may be varied.

Third circular portion 224 has a width which is less than distance B. An outer wall 228 of second circular portion 222 is exposed above third circular portion 224 by a distance D on both sides of the pulley (only one side shown). Therefore the width of third circular portion 224 may be represented by the equation B-2D. An inner wall 250 of fourth circular portion 220 is inclined and insects a flat side wall 252 of second circular portion 224 at an angle b, which is greater than 90°.

In summary, first idler pulley 20 has an overall disc-like shape. The width of first idler pulley 20 has a distance B. First idler pulley 20 includes two ring indentations. First ring indentation 230 is disposed within hub 102 and is a flat indentation. On one side of the idler pulley, first ring indentation 230 has a depth with a distance D. Second ring indentation 232 is disposed between hub 102 and outer circular portion 112. Ring indentation 232 is an undulating indentation, formed by plurality of angled spokes 108. A depth of ring indentation 232 has a distance E and a width of the undulating portion has a width C. The addition of distance A and distance C is equal to distance B.

The above description characterizes an idler pulley for a front end accessory drive serpentine belt system of a vehicle. The idler pulley conformation may have the advantages that spokes connecting the hub to the outermost circular portion are angled. Thus, defects due to material shrinkage and fill will impact the drive belt at an angle as the drive belt is driven over the surface of the idler pulley. This may have the effect of reduced noise generated by impact of defects against the belt. Additionally, the idler pulley may have increased material strength as the spokes are a continuous ring, rather than separate structures.

It will be appreciated that the configurations disclosed herein are exemplary in nature, and that these specific embodiments are not to be considered in a limiting sense, because numerous variations are possible. For example, the above technology can be applied to various types of vehicles, such as small cars or trucks. In another example, the technology can be applied to hybrid vehicle or a combustion engine only vehicle. In yet another example, the pulley design may be included in other pulleys, such as the A/C compressor pulley, the second idler pulley, and/or the crankshaft pulley. Further, still the pulley design may be used in other industrial belt driven systems. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle belt drive system, comprising:

a front end accessory drive including a plurality of accessory pulleys and an idler pulley rotatably coupled via a continuous belt, the idler pulley comprising:

a hub which rotates around and is fixed to a rotational axis;

a belt contacting surface on an outermost circular portion; and angled spokes having continuous peaks and valleys with a height parallel to and around the rotational axis, and connecting the hub and the outermost circular portion.

2. The system of claim 1, wherein the hub comprises a plurality of concentric circles including a first circular portion, a second circular portion, a third circular portion, and a fourth circular portion, the first circular portion innermost of the hub, the fourth circular portion outermost of the hub, the second circular portion disposed between the first circular portion and the fourth circular portion, and the third circular portion between the second circular portion and the fourth circular portion.

3. The system of claim 2, wherein each of the plurality of concentric circles has a flat side wall on each side of the idler pulley, the flat side wall defining a radial length of each of the plurality of concentric circles, the first circular portion having a first radial length, the second circular portion having a second radial length, the third circular portion having a third radial length, the fourth circular portion having a fourth radial length, wherein the first radial length is less than the second radial length, the second radial length is less than the fourth radial length, and the fourth radial length is less than the third radial length.

4. The system of claim 3, wherein the outermost circular portion is a fifth circular portion with a flat side wall defining a fifth radial length of the fifth circular portion, the fifth radial length less than the second radial length and greater than the first radial length.

5. The system of claim 4, wherein the angled spokes are extended between and contact, along a thickness of the angled spokes, an outermost wall of the fourth circular portion and an innermost wall of the fifth circular portion, the angled spokes substantially defining a sixth circular portion which lacks a flat side wall, a sixth radial length of the sixth circular portion defined by a length of the angled spokes, the sixth radial length greater than the third radial length.

6. The system of claim 5, wherein the first circular portion, the second circular portion, the fourth circular portion, the fifth circular portion and the sixth circular portion have a first width, and the third circular portion has a second width, the second width less than the first width, and the third circular portion is indented relative to the first circular portion, the second circular portion, the fourth circular portion, the fifth circular portion, and the sixth circular portion.

7. The system of claim 6, wherein the belt contacting surface is an outermost wall of the fifth circular portion, and the belt contacting surface is substantially flat at an interface with the continuous belt.

8. The system of claim 7, wherein the continuous belt has a third width, the third width less than the first width and greater than the second width.

9. The system of claim 6, wherein in a cross section of adjacent ribs in a plurality of angled ribs, adjacent ribs form a plurality of continuous valleys and peaks, an angle between each of the plurality of valleys and peaks substantially equal, a height of each of the plurality of valleys and peaks substantially equal to the first width.

10. The system of claim 9, wherein the plurality of continuous valleys and peaks include a plurality of rounded portions, each of the plurality of rounded portions located at a top of a peak or a bottom of a valley, the top of the peak or the bottom of the valley located at a side of the idler pulley.

11. The system of claim 10, wherein the plurality of rounded portions are joined by a plurality of straight wall portions, each of the plurality of straight wall portions substantially defining each of the angled spokes.

12. The system of claim 9, wherein the idler pulley has a high load requirement and the angle between each of the plurality of valleys and peaks is between 5° and 100°.

13. The system of claim 3, wherein an innermost wall of the fourth circular portion is inclined at an angle greater than 90° relative to a side wall of the third circular portion.

14. The system of claim 2, wherein the first circular portion encompasses a generally circular space, the generally circular space having a first diameter and the rotational axis having a second diameter, the first diameter and the second diameter substantially equal, and an inner wall of the first circular portion fixed to the rotational axis.

15. The system of claim 1, wherein the continuous belt substantially lacks teeth with specific pitch for mating with the belt contacting surface.

16. The system of claim 1, wherein the plurality of accessory pulleys includes at least a water pump pulley, a power steering pump pulley, a crankshaft pulley, a belt drive tensioner, and an air conditioning compressor, the plurality of accessory pulleys providing power to a plurality of vehicle components.

17. A nylon idler pulley having a disc-like shape, which is one of a plurality of pulleys in a front end accessory drive of an engine for a vehicle for providing power to a plurality of vehicle components, comprising:

a hub which rotates around and is fixed to a rotational axis of the front end accessory drive, the hub having a centrally located circular through hole wherein the rotational axis is fitted;

a belt contacting surface on an outermost wall of an outermost circular portion of the nylon idler pulley, the belt contacting surface being substantially flat at an interface with a continuous belt, the belt contacting surface having a first width and the continuous belt having a second width, the first width greater than the second width; and a plurality of angled spokes, angled between sides of the idler pulley, the plurality of angled spokes extended between, and contacting along a width of the angled spokes, an outermost wall of the hub and an innermost wall of the outermost circular portion, a cross section of the plurality of angled spokes forming a plurality of continuous peaks and valleys, the plurality of continuous peaks and valleys having a height parallel to and around the rotational axis and undulating continuously around the rotational axis, each of the plurality of continuous peaks and valleys having a rounded portion at a top of a peak and a bottom of a valley, each rounded portion at the top of a peak connected to an adjacent rounded portion at the bottom of a valley via a straight wall portion, an angle between each of the plurality of continuous peaks and valleys substantially equal, a height of the plurality of continuous valleys and peaks substantially equal to the first width, the peaks and valleys positioned so that undulations therebetween undulate in a direction parallel to the rotational axis while traversing around the rotational axis.

18. The nylon idler pulley of claim 17, wherein the plurality of angled spokes substantially comprise a first ring indentation and the hub includes a second ring indentation, the first ring indentation being an undulating indentation, the first ring indentation having a first depth, the first depth being equal to the first width less a second width, the second width being a thickness of the plurality of angled spokes, the second ring indentation being a flat indentation with a second depth, the second depth approximately one quarter of the first width.

19. The nylon idler pulley of claim 18, wherein the outermost circular portion has a first radial length, the first ring indentation has a second radial length, and the hub has a third radial length which contribute to a total radial length of the idler pulley, the first radial length less than the second radial length, the second radial length less than the third radial length, the third radial length including a fourth radial length of the second ring indentation, the fourth radial length less than then second radial length and greater than the first radial length.

20. A serpentine belt drive system of a front end accessory drive of an engine for a vehicle, including a plurality of pulleys which are each rotatably attached to a rotational axis of the front end accessory drive and are rotatably coupled via a continuous belt, at least one of the plurality of pulleys, comprising:

a hub having a centrally located generally circular space with a first diameter, the rotational axis having a second diameter, the first diameter and the second diameter substantially equal and an inner wall of the hub affixed to the rotational axis, the hub including a plurality of concentric circles with flat side walls encompassing the centrally located generally circular space, the plurality of concentric circles including a first circular portion and a second circular portion and a fourth circular portion with a first width, a third circular portion with a second width, the first circular portion innermost, the second circular portion disposed between the first circular portion and the third circular portion, the third circular portion disposed between the second circular portion and the fourth circular portion, the fourth circular portion outermost, the second width less than the first width;

a smooth belt contacting surface on an outer wall of a fifth circular portion with flat side walls, the fifth circular portion being an outermost circular portion of the at least one pulley and having the first width, the continuous belt having a third width, the third width less than the first width and greater than the second width; and a plurality of angled spokes, angled between sides of an idler pulley, the plurality of angled spokes extended between and contacting along a width of the angled spokes an outermost wall of the fourth circular portion and an innermost wall of the fifth circular portion substantially comprising a sixth circular portion which is undulated and lacks flat side walls, a cross section of the plurality of angled spokes forming a plurality of continuous peaks and valleys, the plurality of continuous peaks and valleys having a height parallel to and around the rotational axis and undulations undulating continuously around and parallel to the rotational axis, and each of the plurality of continuous peaks and valleys having a rounded portion at a top of a peak or a bottom of a valley, each rounded portion at the top of a peak connected to an adjacent rounded portion at the bottom of a valley via a straight wall portion, an angle between each of the plurality of continuous peaks and valleys being substantially equal, each of the plurality of continuous peaks and valleys having a height substantially equal to the first width, the sixth circular portion having a first radial length, the third circular portion having a second radial length, the second radial length less than the first radial length, the fourth circular portion having a third radial length, the third radial length less than the second radial length, the second circular portion having a fourth radial length, the fourth radial length less than the third radial length, the fifth circular portion having a fifth radial length, the fifth radial length less than the fourth radial length, the first circular portion having a sixth radial length, the sixth radial length less than the fifth radial length.

* * * * *